(12) United States Patent
Ophey

(10) Patent No.: US 6,487,021 B1
(45) Date of Patent: Nov. 26, 2002

(54) HEAD-MOUNTED DISPLAY

(75) Inventor: Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/744,730

(22) PCT Filed: Jun. 19, 2000

(86) PCT No.: PCT/EP00/05639

§ 371 (c)(1),
(2), (4) Date: Jan. 29, 2001

(87) PCT Pub. No.: WO00/79325

PCT Pub. Date: Dec. 28, 2000

(30) Foreign Application Priority Data

Jun. 22, 1999 (EP) .............................................. 99201997

(51) Int. Cl.[7] .............................................. G02B 27/14
(52) U.S. Cl. ....................................... 359/631; 359/633
(58) Field of Search ................................ 359/630, 631, 359/632, 633, 634, 636, 637, 638, 640, 815, 462, 466; 345/7, 8, 9

(56) References Cited

U.S. PATENT DOCUMENTS

| | | | |
|---|---|---|---|
| 5,734,359 A | * 3/1998 | Van Hooreweder | 345/8 |
| 5,771,124 A | 6/1998 | Kintz | 359/633 |
| 5,812,323 A | * 9/1998 | Takahashi | 359/630 |
| 5,875,056 A | * 2/1999 | Takahashi | 359/633 |
| 5,886,822 A | * 3/1999 | Spitzer | 359/630 |
| 5,886,823 A | * 3/1999 | Sugano | 359/630 |
| 5,903,396 A | * 5/1999 | Rallison | 359/630 |
| 5,940,218 A | * 8/1999 | Takahashi | 359/630 |
| 6,195,207 B1 | * 2/2001 | Takahashi | 359/637 |

OTHER PUBLICATIONS

Patent Abstract of Japan: Publication No.: 0090312A; Application No.: 07249110; Date of Filing Sep. 27, 1995; Date of Publication: Apr. 4, 1987; Int'l Class G05F 1/13.

* cited by examiner

*Primary Examiner*—Georgia Epps
*Assistant Examiner*—Saeed Seyrafi
(74) *Attorney, Agent, or Firm*—Gregory L. Thorne

(57) ABSTRACT

The invention relates to a head-mounted display provided with an image display device and an optical system. The optical system comprises a concave mirror and a semi-transmissive element for projecting an image to be formed by the image display device via the concave mirror, the semi-transmissive element and an exit pupil of the head-mounted display on a user's retina. To improve the resolution of a displayed image of the head-mounted display, a first lens means is arranged between the image display device and the semi-transmissive element.

8 Claims, 7 Drawing Sheets

HEAD-MOUNTED DISPLAY

BACKGROUND OF THE INVENTION

1. Field of the Invention

The invention relates to a head-mounted display provided with an image display device and an optical system comprising a concave mirror and a semi-transmissive element for projecting an image to be formed by the image display device on a user's retina via, consecutively, the semi-transmissive element, the concave mirror, the semi-transmissive element and an exit pupil of the head-mounted display.

2. Description of the Related Art

A device of the type described above is known from the English-language abstract of Japanese patent application 09090312 A. In a head-mounted display described in this document, an image is formed by means of a liquid crystalline image display panel, which image is projected in the exit pupil of the head-mounted display by means of an optical system comprising a splitting mirror and a concave mirror. During use, the exit pupil coincides with the eye pupil of a user of the head-mounted display, so that an image is formed on the retina. The head-mounted display may be worn by a user for displaying, for example, TV or video images or pictures associated with portable information and communication systems, computer games or computer simulations.

The known head-mounted display has a comparatively low cut-off frequency of the optical modulation transfer function so that the use of an image display device with a high resolution of, for example, a frame matrix of 1024×768 pixels with a diagonal dimension of 0.5 inch is hardly useful.

BRIEF SUMMARY OF THE INVENTION

It is an object of the invention to improve the optical modulation transfer function. To this end, the device according to the invention is characterized in that the head-mounted display comprises a first lens which is arranged between the image display device and the semi-transmissive element for collimating radiation to be generated by the image display device in the optical system. Since the first lens collimates the radiation to be generated, coming from the image display panel, the radiation is concentrated along an optical axis of the optical system so that the distortion is reduced and the cut-off frequency of the optical modulation transfer function is increased. A further advantage of placing the lens is that the distortion in the corners of the image is reduced.

A particular embodiment of the head-mounted display according to the invention is characterized in that the first lens has a convex surface and a substantially plane surface, and the convex surface faces the semi-transmissive element. It appears that, with such an arrangement, the optical modulation transfer function is further improved.

A further embodiment of the head-mounted display according to the invention is characterized in that the optical system comprises a $\lambda/4$ plate which is arranged between the semi-transmissive element and the concave mirror, and the semi-transmissive element comprises a polarization-dependent beam splitter for reflecting radiation polarized in a first direction and to be generated by the image display device, and for selectively passing radiation polarized in a second direction and coming from the concave mirror and the $\lambda/4$ plate. The use of the $\lambda/4$ plate and the polarization-dependent beam splitter reduces the background illumination and enhances the transmission of the radiation generated by the image display device.

A further embodiment of the head-mounted display according to the invention is characterized in that the polarization-dependent beam splitter comprises two prisms which are separated by a beam-splitting surface having a polarization beam-splitting layer for reflecting the radiation polarized in the first direction and to be generated by the image display device, and for selectively passing the radiation polarized in the second direction and coming from the concave mirror and the $\lambda/4$ plate. Such a polarization beam-splitting layer is known from, for example, the handbook "Thin Film Optical Filters" as published by H.A. Macleod, p. 328, section 33. This polarization beam-splitting layer comprises, for example, a stack of optical layers which alternately have a high and a low refractive index. By using such a polarization-dependent beam splitter, a transmission of substantially 100% is achieved for the radiation coming from the image display device. A further advantage is that a thickness of the head-mounted display is reduced, which thickness is determined by the distance between the concave mirror and the exit pupil. The use of a $\lambda/4$ plate and a polarization-dependent beam splitter in a head-mounted display is known per se from United States patent U.S. Pat. No. 5,771,124.

A further embodiment of the head-mounted display according to the invention is characterized in that the polarization-dependent beam splitter comprises a semi-transmissive reflector and a polarization-dependent reflector for reflecting radiation polarized in the first direction and to be generated by the image display device, and for selectively passing the radiation polarized in the second direction. The use of the polarization-dependent beam splitter of this second type is advantageous because it provides a construction of the head-mounted display with a lower weight as compared with the weight of the above-mentioned head-mounted display of a first type which comprises the prisms. It is to be noted that the transmission of the radiation of the head-mounted display of the second type, coming from the image display device, is a factor of eight lower than a corresponding transmission of the head-mounted display of the first type.

A further embodiment of the head-mounted display according to the invention is characterized in that the semi-transmissive reflector has an angle-dependent reflective layer which has a relatively high reflection for large angles of incidence and a relatively low reflection for small angles of incidence. Such a layer comprises a packet of sub-layers which alternately comprise a sub-layer of optically dense material and a sub-layer of optically less dense material, the thickness of the sub-layer being equal to half the wavelength of the radiation applied.

The transmission of the head-mounted display is enhanced by using such a layer.

A further embodiment of the head-mounted display according to the invention is characterized in that the head-mounted display comprises a second lens which is arranged between the semi-transmissive element and the exit pupil for prefocusing the radiation from the semi-transmissive element to the exit pupil of the head-mounted display.

A further embodiment of the head-mounted display according to the invention is characterized in that the head-mounted display comprises at least an optical element having an aspherical surface. The use of optical elements with aspherical surfaces reduces imaging errors such as coma, astigmatism and curvature of the field.

These and other aspects of the invention are apparent from and will be elucidated with reference to the embodiments described hereinafter.

DETAILED DESCRIPTION OF THE INVENTION

Figure 1:
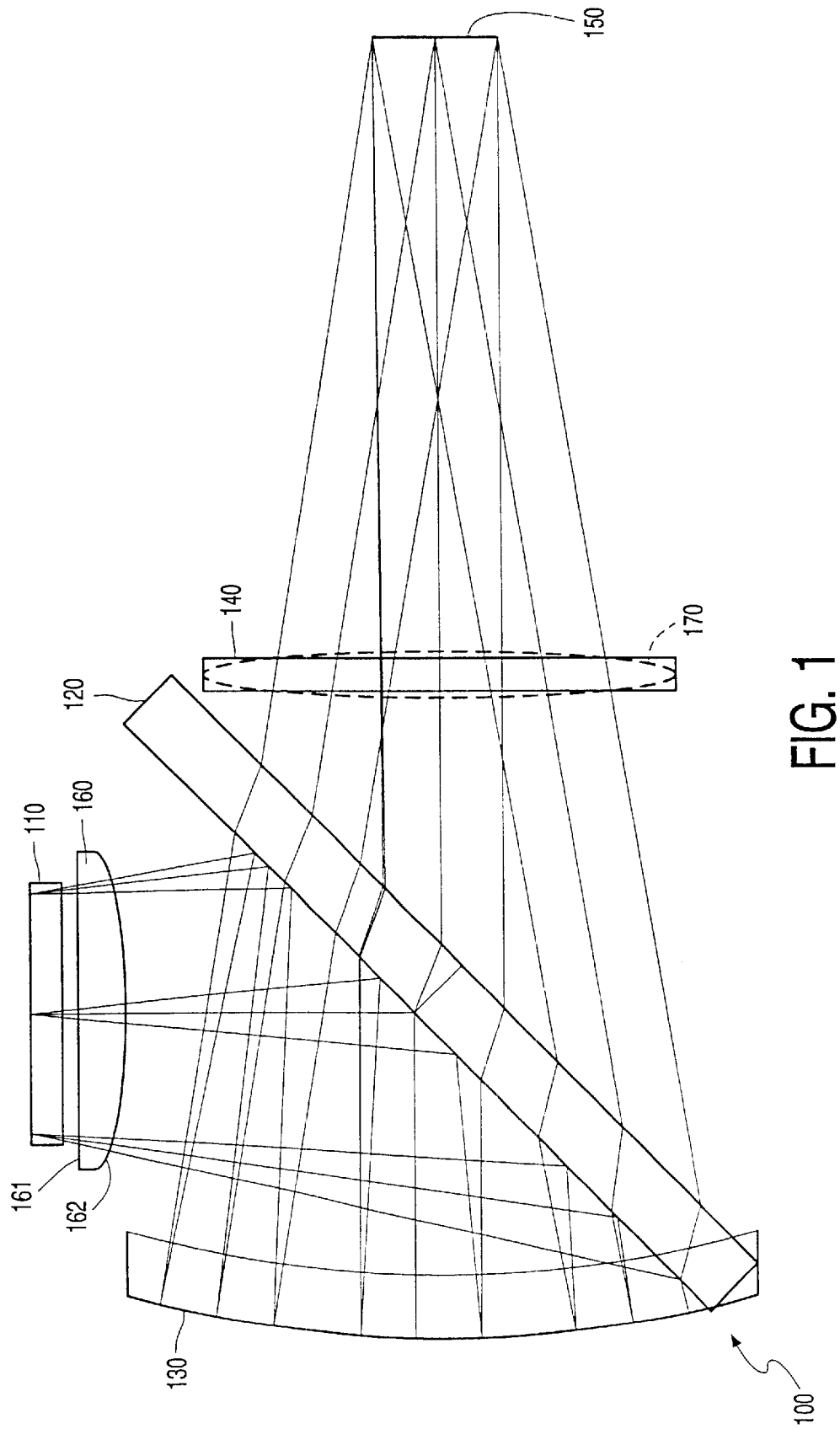
FIG. 1 shows a first embodiment of a head-mounted display according to the invention.

FIG. 1 shows an embodiment of a head-mounted display 100, comprising an image display device, for example, a transmissive liquid crystalline image display panel 110 with an illumination unit (not shown), and an optical system comprising a concave mirror 130 and a semi-transmissive optical element 120, for example, a splitting mirror. The optical system projects an image to be formed by the transmissive liquid crystalline image display panel 110 via an exit pupil 150 of the head-mounted display on the retina of a user's eye. When the head-mounted display is operative and worn by the user, radiation of the image formed by the liquid crystalline image display panel 110 will be incident on the splitting mirror 120. The splitting mirror 120 reflects a part of the radiation on the concave mirror 130, which collimates this radiation via the splitting mirror 120, a window 140 and the exit pupil 150 on a retina of a user's eye (not shown). The radiation through the exit pupil 150 passes through an eye pupil of the user and forms an image on the retina (not shown). So far, the head-mounted display shown corresponds to the known head-mounted display. This known head-mounted display is, however, hardly suitable for imaging images coming from high-resolution liquid crystalline image display panels.

To use liquid crystalline image display panels with a high resolution, for example, a matrix of 1024×768 pixels with an image diagonal of 0.5 inch, the head-mounted display requires an optical system which has an optical modulation transfer function whose cut-off frequency is, for example, 50 cycles per mm or more. In this patent application, the cut-off frequency is understood to mean the image frequency at which the value of the optical modulation transfer function is 30%. To improve the optical modulation transfer function, a first lens 160 is arranged, according to the invention, between the splitting mirror 120 and the liquid crystalline image display panel 110. This first lens 160 collimates the radiation from the liquid crystalline image display panel 110 along an optical axis of the optical system. The first lens 160 preferably has a convex surface 161 and a substantially plane surface 162. Furthermore, the convex surface 161 of the first lens 160 faces the splitting mirror 120. The head-mounted display preferably comprises a second lens 170, shown in a broken line, which ensures a prefocusing of the exiting radiation, which second lens 170 may be arranged at the location of the window 140.

To increase the light output and reduce the background illumination, the optical system preferably comprises a $\lambda/4$ plate and a polarization-dependent beam splitter for selectively passing the radiation polarized in a first direction and generated by the liquid crystalline image display panel. This second embodiment of the head-mounted display according to the invention, comprising such a polarization-dependent beam splitter, is shown in FIG. 2.

Figure 2:
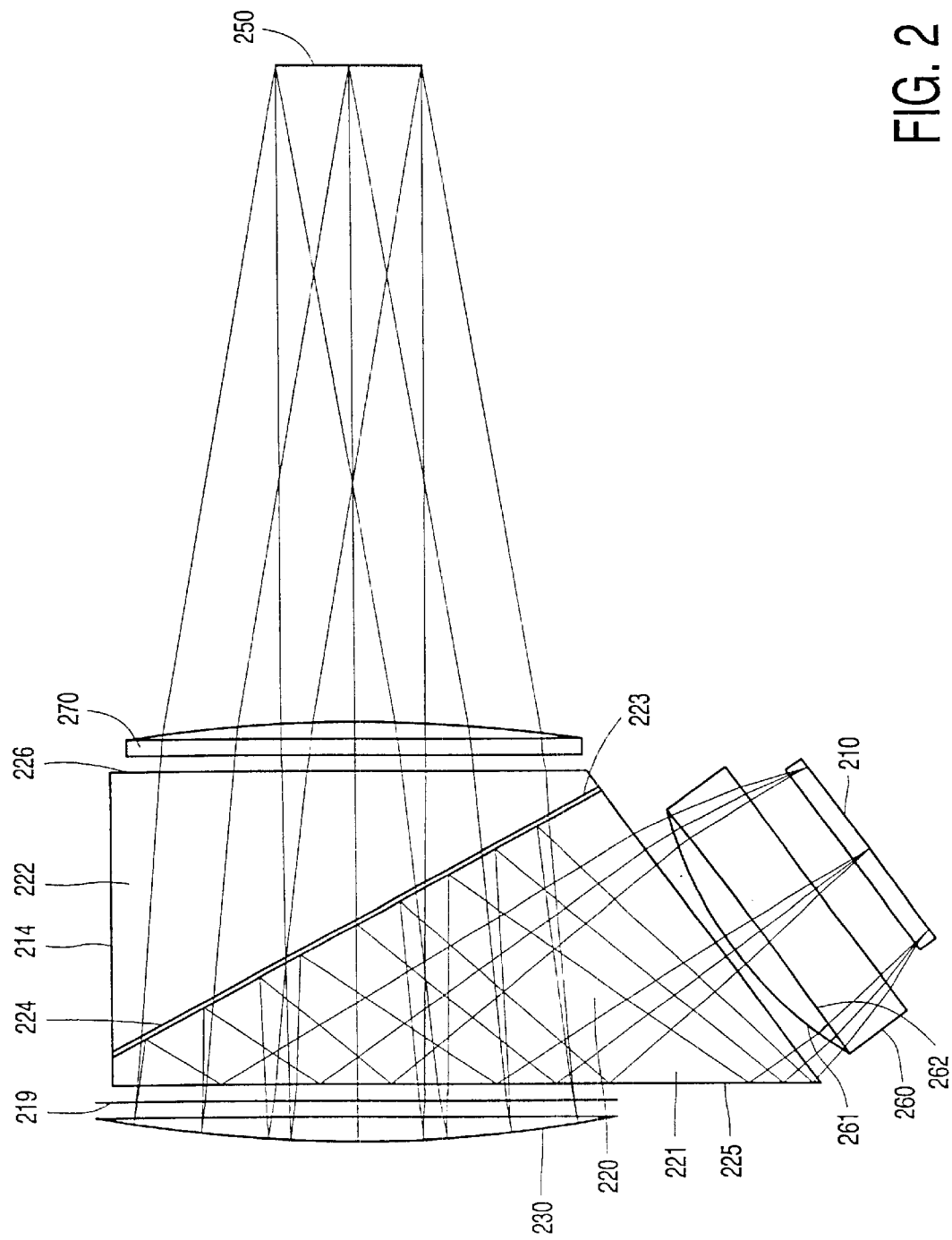
FIG. 2 shows a second embodiment of a head-mounted display according to the invention.

FIG. 2 shows an example of the second embodiment 200 of a head-mounted display according to the invention, comprising a liquid crystalline image display panel 210, the first lens 260, the concave mirror 230, two prisms 221, 222 which constitute a splitting cube comprising the polarization-dependent beam splitter 220 and a $\lambda/4$ plate 219. When the head-mounted display is operative, radiation linearly polarized in a first direction of the image and formed by the liquid crystalline image display panel 210 will be collimated by the first lens 260 and enter the first prism 221. The first lens 260 preferably has a convex surface 261 and optical plane surface 262. The convex surface 261 faces the first prism 221. The first exit face 225 of this first prism 221 reflects the radiation linearly polarized in the first direction by total internal reflection on the beam-splitting surface 223. This beam-splitting surface 223 has a polarization beam-splitting layer 224, for example, a stack of optical layers alternately having a high and a low refractive index. This polarization beam-splitting layer 224 is known from the previously quoted handbook "Thin Film Optical Filters", published by H.A. Macleod, p. 328, section 33. This polarization beam-splitting layer 224 reflects the radiation polarized in the first direction towards the first exit face 225 of the first prism 221. The reflected radiation polarized in the first direction subsequently exits from the first prism 221 and passes through the $\lambda/4$ plate 219 to the concave mirror 230. The $\lambda/4$ plate 219 converts the radiation polarized in the first direction into circularly polarized radiation, for example, levorotatory polarized radiation. The concave mirror 230 reflects the levorotatory polarized radiation via the $\lambda/4$ plate 219 back to the first prism 221. Upon reflection on the concave mirror, the levorotatory polarized radiation changes into dextrorotatory polarized radiation. Subsequently, the $\lambda/4$ plate 219 converts the dextrorotatory polarized radiation into radiation polarized in a second direction, with the second direction of polarization being transverse to the first direction of polarization. The polarization beam-splitting layer 224 on the beam-splitting surface 223 passes the radiation polarized in the second direction to the second prism 222. The radiation polarized in the second direction subsequently passes through the second exit face 226 of the second prism 222 to the exit pupil 250. In this way, a substantially 100% transmission of radiation coming from the liquid crystalline image display panel is achieved in a head-mounted display of this type. The head-mounted display further preferably comprises a second lens 270 which ensures a prefocusing of the exiting radiation.

Figure 3:
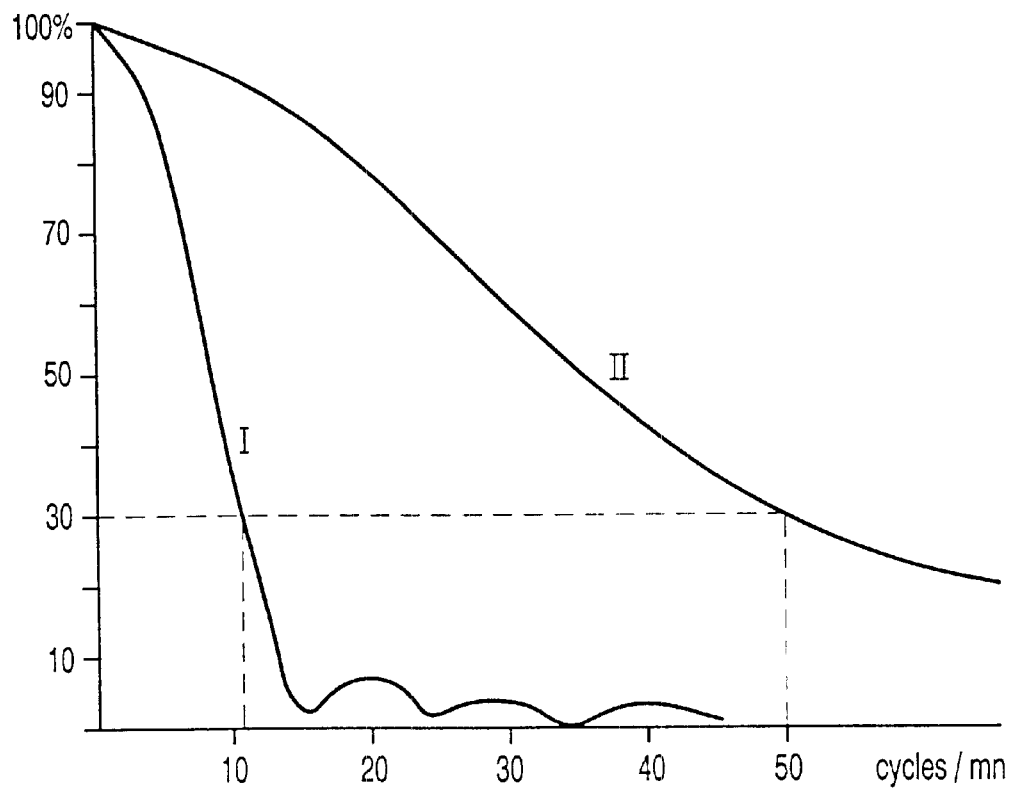
FIG. 3 shows two curves representing an optical modulation transfer function.
Figure 5:
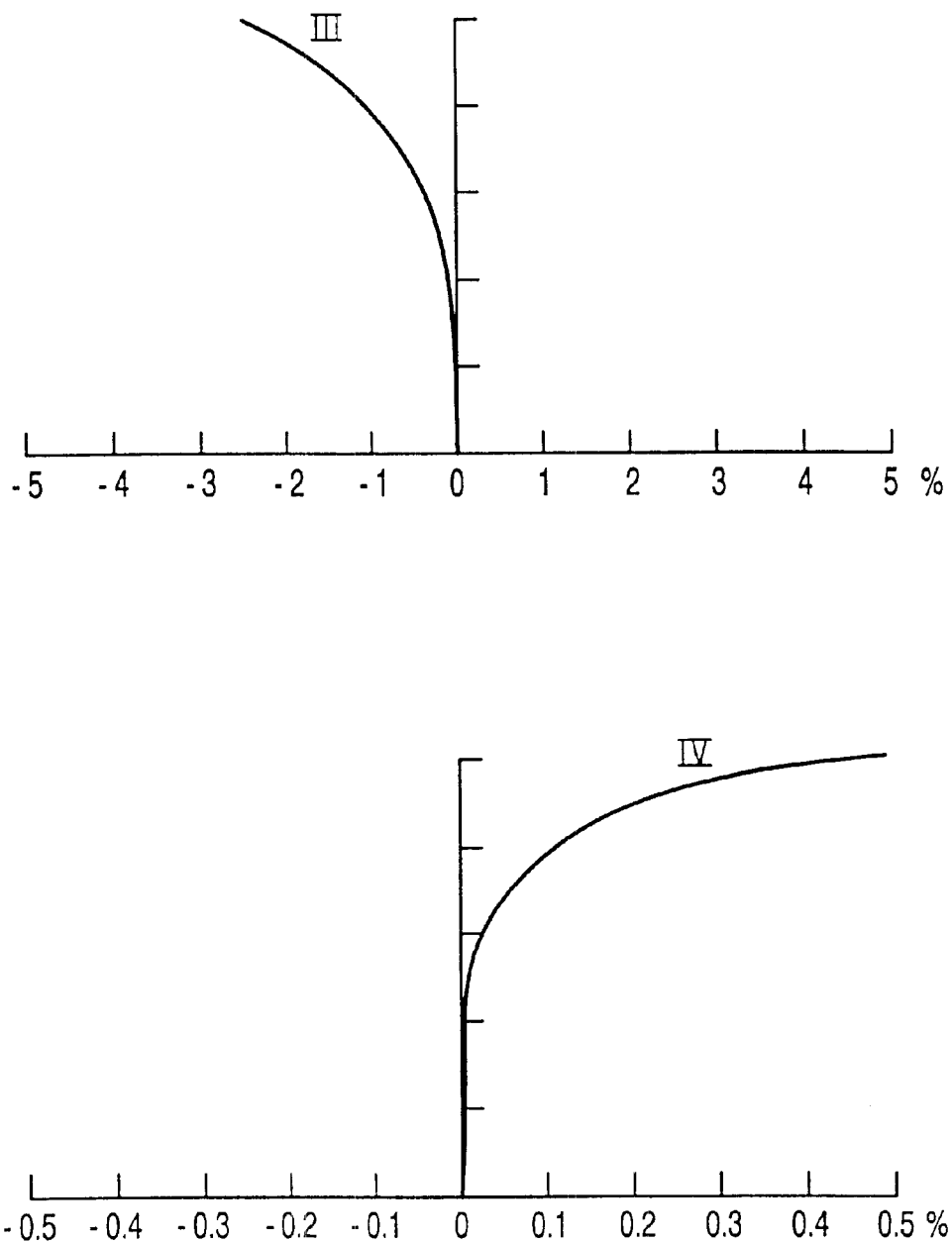
FIG. 5 shows two curves representing the distortion of different head-mounted displays.

The effect of the first lens 260 in the optical system of the second embodiment of the head-mounted display according to the invention will be explained with reference to FIG. 3. FIG. 3 shows two curves I, II representing an optical modulation transfer function. In the associated graphs, the spatial frequency is plotted in cycles per mm on the horizontal axis and the value of the optical modulation transfer function is plotted on the vertical axis. The first curve I represents the optical modulation transfer function of a first computer simulation of an optical system which is partly identical to the optical system of a head-mounted display shown in FIG. 2, but without the first lens 260. It is apparent from the first curve I that the cut-off frequency of the optical modulation transfer function is approximately 12 cycles per mm. The second curve II represents an optical modulation transfer function of a second computer simulation of the optical system of the second embodiment of a head-mounted display as shown in FIG. 2, with a first lens 260 according to the invention. It is apparent from the second curve II that the cut-off frequency of the optical modulation transfer function for this system is approximately 50 cycles per mm. A further advantage of the head-mounted display with the first lens 260 according to the invention is that the distortion in the angles of the image in the exit pupil 250 has decreased to approximately 0.5%, whereas this distortion for the optical system shown in FIG. 2, but without the first lens 260, is approximately 2.5%. This is also apparent from said computer simulations. FIG. 5 shows a third curve III and a fourth curve IV which indicate distortions of the first and the second computer simulation. The third curve III represents the distortion of the first computer simulation of the optical system which is partly identical to the optical system of the head-mounted display shown in FIG. 2, but without the first lens 260. In the graph associated with the third curve III, the distortion of an imaged frame with respect to an undistorted ideal frame is plotted in percent units on the horizontal axis. The distance from the center of the image is plotted on the vertical axis. The fourth curve IV represents the distortion in accordance with the second computer simulation of the optical system of the second embodiment of the invention as shown in FIG. 2, with the first lens 260. In the graph associated with the fourth curve IV, the distortion of an imaged frame with respect to an undistorted ideal frame is plotted in units of 1/10 percent on the horizontal axis. The distance from the center of the image is plotted on the vertical axis.

Figure 4:
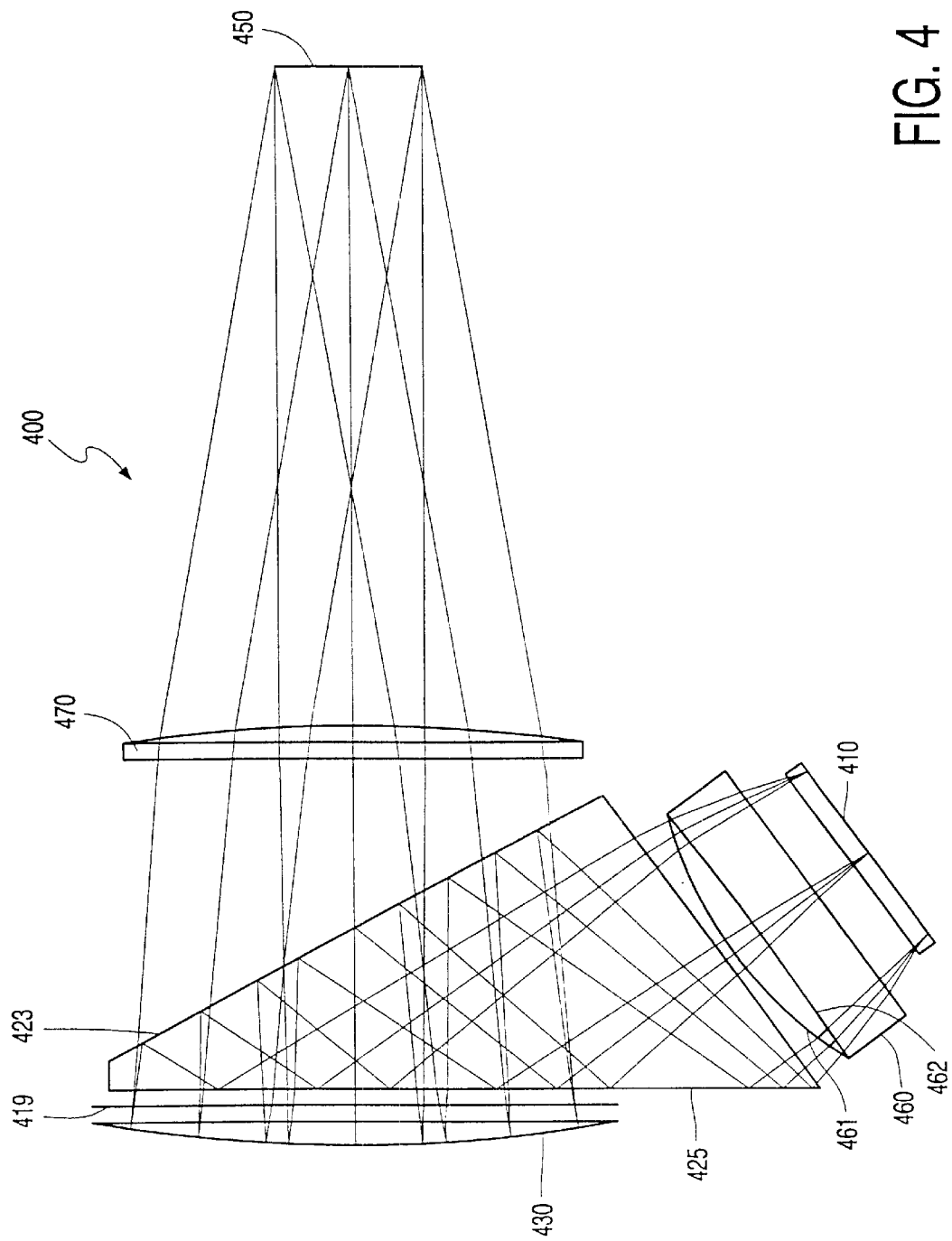
FIG. 4 shows a third embodiment of a head-mounted display according to the invention.

A third embodiment of the head-mounted display according to the invention is shown in FIG. 4. FIG. 4 shows the third embodiment 400 of the head-mounted display comprising a liquid crystalline image display panel 410, a first lens 460, a concave mirror 430, a first splitting mirror 425, a polarization-dependent reflector 423, a $\lambda/4$ plate 419 and a second lens 470. In this third embodiment, the polarization beam splitter is constituted by the first splitting mirror 425 and the polarization-dependent reflector 423. The first splitting mirror 425 and the polarization-dependent reflector 423 replace the first exit face 225 of the first prism 221 and the polarization beam-splitting layer 224 on the beam-splitting surface 223 between the two prisms 221, 222, respectively, of the optical system as shown in FIG. 2. When the head-mounted display is operative, radiation, polarized in the first direction, of the image formed by the liquid crystalline image display panel 410 will be collimated by the first lens 460 in the optical system. The first lens 460 preferably has a convex surface 461 and an optical plane surface 462. The convex surface 461 faces the splitting mirror 425. The splitting mirror 425 reflects a large part of the radiation towards the polarization-dependent reflector 423. The polarization-dependent reflector 423 comprises, for example, a reflective polaroid of the Double Brightness Enhancement Film (DBEF) type as supplied by 3 M™. The reflective polaroid 423 reflects the radiation linearly polarized in the first direction, which first direction is substantially perpendicular to the director of the reflective polaroid, via the splitting mirror 425 and the $\lambda/4$ plate 419 to the concave mirror 430. The $\lambda/4$ plate 419 converts the linearly polarized radiation into circularly polarized radiation, for example, levorotatory circularly polarized radiation. The concave mirror 430 reflects the levorotatory circularly polarized radiation via the $\lambda/4$ plate 419 back to the splitting mirror 423. Upon reflection on the concave mirror, the levorotatory circularly polarized radiation changes into dextrorotatory circularly polarized radiation. The $\lambda/4$ plate 419 subsequently converts the dextrorotatory circularly polarized radiation into radiation polarized in a second direction, which second direction of polarization is transverse to the first direction of polarization of the radiation passing the $\lambda/4$ plate 419 for the first time. The reflective polaroid 423, whose director is parallel to the second direction of polarization of the radiation transmitted for the second time, passes this radiation so that this radiation goes via the second lens 470 and the exit pupil 450 of the optical system of the head-mounted display to the user's eye and forms an image via a pupil on the user's retina. The second lens 470 ensures a further prefocusing of the exiting radiation. An advantage of the polarization beam splitter comprising the splitting mirror 425 and the reflective polaroid 423 is that the weight of the head-mounted display can be reduced. It is to be noted that this weight advantage is accompanied by a loss of light of a factor of eight with respect to a head-mounted display using a polarization-dependent beam splitter comprising the prisms 221, 222. This loss of light can be compensated in the illumination system of the liquid crystalline image display panel.

One way of reducing this loss of light is the use of an angle-dependent reflective layer on the splitting mirror 425. The angle-dependent reflective layer comprises a packet of sub-layers optimized for a maximum reflection at large angles of incidence and a minimum reflection at small angles of incidence. The substrate preferably comprises a material having a relatively large refractive index, for example, a glass plate BK-7 as supplied by the firm of Schott.

Figure 6:
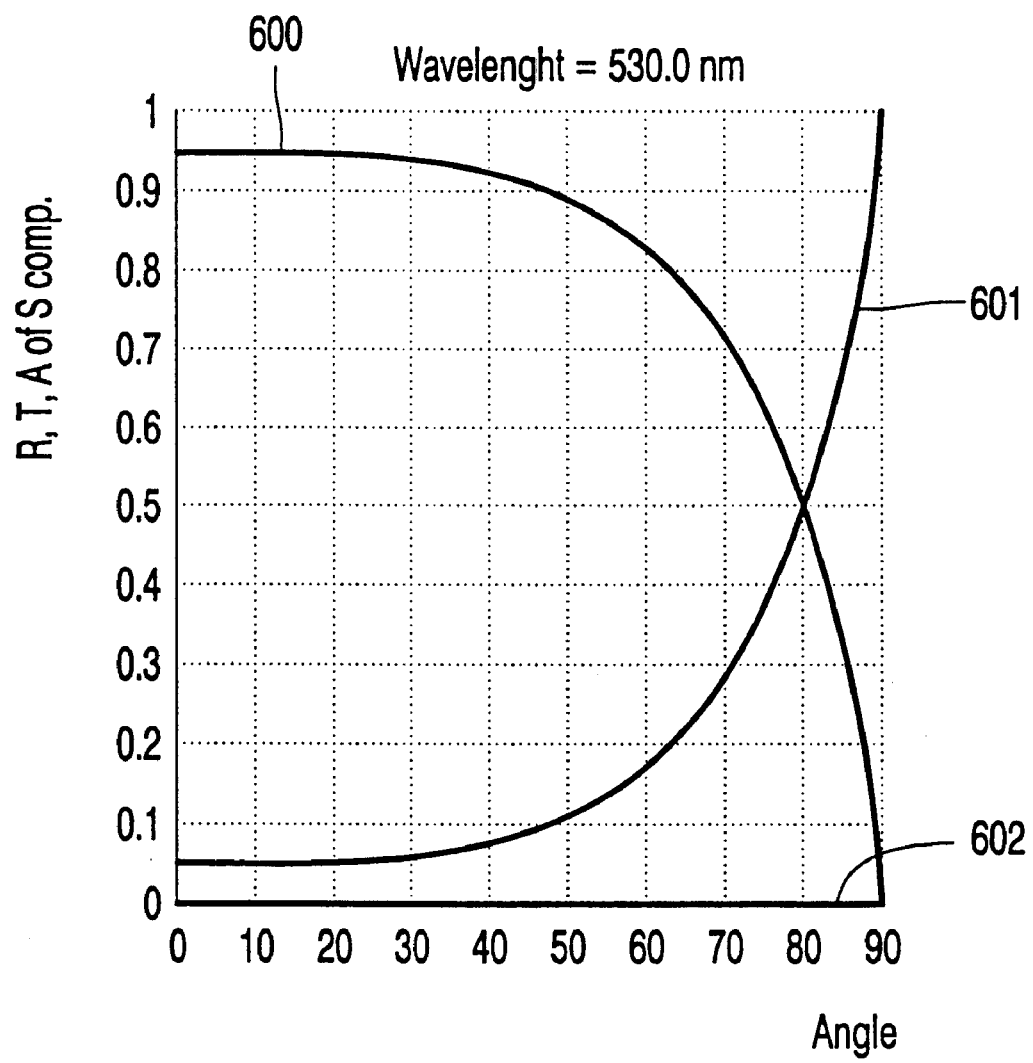
FIG. 6 shows three curves representing the reflection, transmission and absorption, respectively, as a function of the angle of incidence for an untreated glass.

FIG. 6 shows the angle dependence of the reflection, transmission and absorption, respectively, of an untreated BK-7 glass plate without an angle-dependent reflective layer. The graph in FIG. 6 shows three curves 600, 601, 602 representing the reflection, transmission and absorption, respectively, as a function of the angle of incidence for S-polarized radiation. The efficiency for radiation transmission in a system as shown in FIG. 4, in which reflection occurs once and transmission occurs twice for the glass plate, then is 0.12×0.96×0.96=0.11. An improved efficiency is achieved when an angle-dependent reflective layer is provided on the glass plate. This layer comprises a packet of sub-layers which alternately comprises a sub-layer of optically dense material and a sub-layer of optically less dense material, the thickness of the sub-layer being equal to half the wavelength of the radiation applied. The angle dependence of the reflection, transmission and absorption of a glass plate provided with such a layer is shown in FIG. 7.

Figure 7:
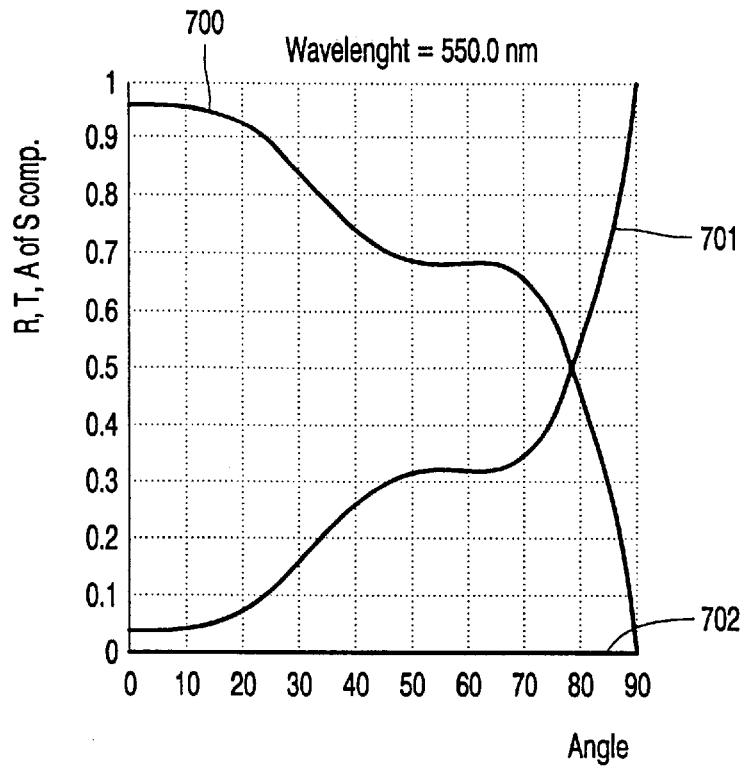
FIG. 7 shows three curves representing the reflection, transmission and absorption, respectively, as a function of the angle of incidence for a glass having an angle-dependent reflective layer.

FIG. 7 shows the angle-dependent reflection of the BK-7 glass plate provided with a packet of layers of, for example, 7 sub-layers, which layer packet alternately comprises a first sub-layer of $ZrO_2$ and a second layer of $Ta_2O_5$. The sub-layers have a thickness of half the wavelength of the radiation applied. The graph in FIG. 7 shows three curves 700, 701, 702 representing the reflection, transmission and absorption, respectively, of the angle-dependent reflective layer as a function of the angle of incidence for S-polarized radiation. It is apparent from the graphs 700, 701, 702 that the radiation transmission efficiency in the previously mentioned system as shown in FIG. 4, in which reflection occurs once and transmission occurs twice in the glass plate, is now 0.12×0.96×0.96=0.11. Moreover, the efficiency of said system is dependent on the wavelength.

Figure 8:
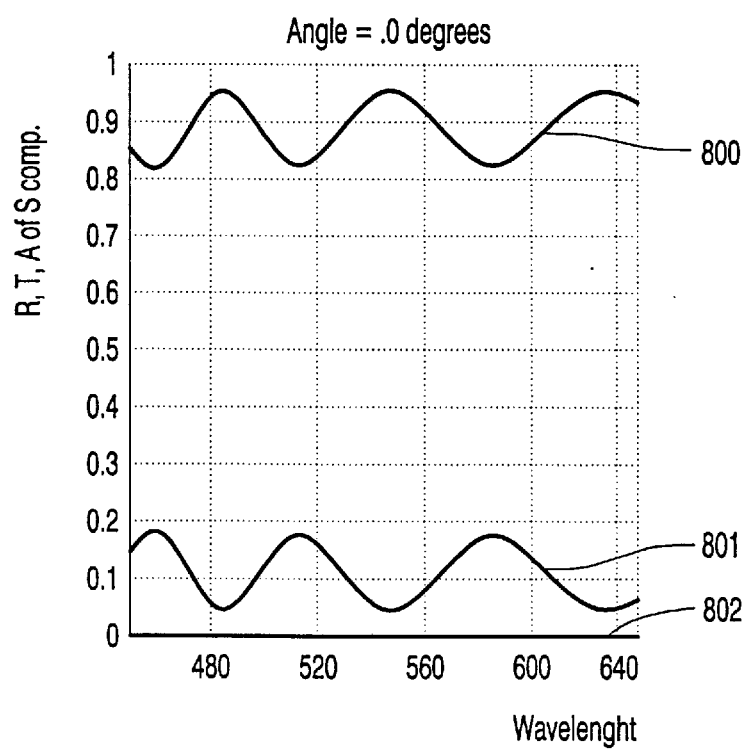
FIG. 8 shows three curves representing the reflection, transmission and absorption, respectively, of an S-polarization component of incident radiation as a function of the wavelength for a glass having an angle-dependent reflective layer at an angle of incidence of 0 degrees.

FIG. 8 further shows three curves representing the reflection, transmission and absorption, respectively, of the angle-dependent reflective layer as a function of the wavelength. It is apparent from this graph that the efficiency is minimally 0.33×0.82×0.82=0.22. A further example of another angle-dependent reflective layer is a packet of 9 sublayers comprising alternately ZnS and $T_2O_2$.

The head-mounted display further preferably comprises a second lens 470 ensuring a prefocusing of the exiting radiation.

To reduce image errors such as coma, astigmatism and curvature of the field, a plurality of the curved surfaces of the optical elements in the above-described embodiments of the head-mounted display is preferably aspherical, for example, the curved surfaces of the first lens, the concave mirror and the second lens.

Instead of a transmissive liquid crystalline image display panel in the above-described embodiments of the head-mounted display, it is alternatively possible to use a reflective liquid crystalline image display panel with an associated illumination system. A cathode ray tube in combination with a linear polarizer, whose director is directed in the first direction, may also be used.

What is claimed is:

1. A head-mounted display provided with
   an image display device and
   an optical system comprising
      a concave mirror and
      a semi-transmissive element for projecting an image to be formed by the image display device on a user's retina, that includes
         a prism having a first edge, a second edge, and a third edge,
   characterized in that
      the head-mounted display comprises a first lens which is arranged between the image display device and the semi-transmissive element for collimating radiation to be generated by the image display device in the optical system, and
      the optical system is configured such that light from the image display device:
         enters the prism via the first edge,
         is reflected at the second edge toward the third edge,
         is reflected at the third edge toward the second edge,
         exits the prism at the second edge,
         is reflected by the concave mirror toward the second edge,
         re-enters the prism through the second edge, and
         exits the prism at the third edge toward an exit pupil of the head-mounted display.

2. A head-mounted display as claimed in claim 1, characterized in that the first lens has a convex surface and a substantially plane surface, and the convex surface faces the semi-transmissive element.

3. A head-mounted display as claimed in claim 1, characterized in that
   the optical system comprises
      a $\lambda/4$ plate which is arranged between the semi-transmissive element and the concave mirror, and
   the third edge of the prism includes
      a polarization-dependent beam splitter
         for reflecting radiation polarized in a first direction toward the second edge, and
         for selectively passing radiation polarized in a second direction toward the exit pupil.

4. A head-mounted display as claimed in claim 3, further including
   an other prism having an edge adjacent to the third edge.

5. A head-mounted display as claimed in claim 3, characterized in that the polarization-dependent beam splitter comprises a semi-transmissive reflector and a polarization-dependent reflector for reflecting radiation polarized in the first direction and to be generated by the image display device, and for selectively passing the radiation polarized in the second direction.

6. A head-mounted display as claimed in claim 3, characterized in that
   the second edge includes an angle-dependent reflective layer which has
      a relatively high reflection for large angles of incidence and
      a relatively low reflection for small angles of incidence.

7. A head-mounted display as claimed in claim 1, characterized in that the head-mounted display comprises a second lens which is arranged between the semi-transmissive element and the exit pupil for prefocusing radiation from the semi-transmissive element to the exit pupil of the head-mounted display.

8. A head-mounted display as claimed in claim 1, characterized in that the head-mounted display comprises at least an optical element having an aspherical surface.

* * * * *